2,996,119
FIRE-EXTINGUISHING APPARATUS AND METHOD

Kenneth George Kimber, Ickenham, Frank Raymond Makeham, Horley, and Peter Charles Foden, Sunbury-on-Thames, England, assignors to The Pyrene Company Limited
No Drawing. Filed Aug. 12, 1958, Ser. No. 754,543
Claims priority, application Great Britain Aug. 12, 1957
3 Claims. (Cl. 169—1)

Dry chemical compositions in the form of powder are commonly used to extinguish fires, particularly burning liquids such as gasoline. It is sometimes desirable to use these compositions in conjunction with foam: for example, after a fire has been extinguished with powder a layer of foam may be applied to prevent re-ignition. Again if an airplane crashes in an airfield two fire appliances may immediately attack any fire, one applying foam and the other a dry powder. Unfortunately, it is found that the kinds of dry-chemical fire-extinguishing agents at present commonly in use are incompatible with foam. By this we mean that the foam rapidly breaks down on coming into contact with the dry chemical.

It is obviously essential in formulating a dry-chemical composition which will have the best compatibility with foam, that at the outset, the principal constituent or base material should be itself compatible with foam. This is probably one important reason why conventional dry-chemical formulations in current used, based as they are on sodium bicarbonate, have poor compatibility with foam. Sodium bicarbonate has an extremely high rating as a combustion inhibitor and flame suppressor, and our research has shown that, in fact, it has few equals in this respect. A suitable base material must have other very important attributes, such as low toxicity, low abrasive and low corrosive properties, and satisfactory flow and non-caking properties. To satisfy all these requirements, as does sodium bicarbonate, and in addition to achieve good compatibility with foam, is an extremely difficult task.

It is an object of this invention to provide a dry-powder fire-extinguishing agent that is compatible with foam.

Another object of the invention is to enable a fire to be attacked with both foam and dry powder without premature destruction of the foam by the powder.

We have now found that potassium sulphate is more compatible than sodium bicarbonate with foam, is as effective in inhibiting combustion and suppressing flame as sodium bicarbonate, and admirably satisfies the other requirements.

In processes according to our invention fires are attacked with both foam and a dry powder having potassium sulphate as an important constituent and generally as the principal constituent.

The invention also provides a dry-powder fire-extinguishing composition based on potassium sulphate.

An important requirement of finely divided powders for fire-fighting is that they should have suitable flow properties to ensure that they can be discharged with maximum efficiency from the equipment in which they are to be used. For this reason it is well known to add so-called "flow-promoting agents." These fall into three broad categories:

(1) Materials such as wax, metallic soaps and silicones, which probably function as lubricants between individual particles of the powder. Many such materials are valuable also as waterproofing agents.

(2) Filler materials such as mica, talc or heavy magnesium oxide. These are characterized by a particle shape which is substantially consistent and of value in promoting relative movement between the particles of the powder.

(3) Materials such as porous silica or starch with a very low bulk density. These materials counteract the tendency of the powder to compact during storage and so increase its properties of flow after storage.

For the purposes of this specification a flow-improving agent is one which makes a powder to which it has been added flow more easily after undisturbed storage for twelve weeks than an identical powder without the flow-improving agent.

A powder according to the invention contains a minor proportion of flow-improving agent. There may be, and preferably is, more than one such agent in the composition. In particular, if the powder is liable to be exposed to a moist atmosphere, as is generally the case, it should be waterproofed, and so the composition may include a flow-promoting agent that has waterproofing properties, and also an agent such as talc or mica. Again, because of the different particle shape of mica, which has laminar particles, and heavy magnesium oxide, which has approximately spherical particles, it is advantageous to include both these.

The total amount of flow-promoting agent may be as little as 0.25% by weight of the composition, or as much as 20%.

Considering the separate categories of flow-promoting agents, metallic soaps, such as magnesium stearate, reduce the compatibility with foam, so if a flow-promoting agent thtat has waterproofing properties is to be included, it is preferably a silicone having water-repelling properties or a wax, which is preferably a hydrocarbon, halogenated hydrocarbon or ester wax. The wax is preferably used as a powder finer than the particles of the base material, and may be smeared over the surface of these particles by ball-milling the ingredients together. Alternatively, the wax or other waterproofing agent may be applied to the powder, or part of the powder, as a solution in a volatile solvent., There is no advantage in using more than 5% of a wax or silicone, so the preferred range in which a flow-promoting agent of this category is present is 0.25 to 5%.

Although metallic soaps reduce the compatibility with foam, the addition of a small amount of such a soap, i.e. up to 1.5% can be tolerated.

Flow-promoting agents of the second category, i.e. mica, talc and so forth, should as a rule be present in an amount of at least 1% to be effective, so the preferred range of the total of these is from 1 to 20%.

Flow-promoting agents of the third category, i.e. porous silica, starch and so forth, should likewise be present in an amount of at least 1% but are not required in amounts greater than 10%, so the preferred range of these is from 1 to 10%.

Commercial grades of potassium sulphate vary widely from distinctly acid to distinctly alkaline in their reaction. We find that best results are obtained from potassium sulphate of substantially neutral reaction, by which statement we mean that a 5% aqueous solution at 20° C. should have a pH of from 5 to 9 and preferably from 6 to 8.

The preferred compositions contain only the potassium sulphate as the principal ingredient (advantageously amounting to at least 90%) and one or more flow-promoting agents. However, an inert powder may replace a large part of the potassium sulphate if desired, though there must always be at least 25% potassium sulphate. By "inert powder" we mean any powdered material that is commonly regarded as insoluble in water, and that may in reality be sparingly soluble, such as stone dust, china clay and calcium sulphate. Such powders present the advantage that they are cheap, so when some loss of fire-extinguishing efficiency can be tolerated, e.g. for fires occurring in small paint or solvent tanks in which the major part of the fire may be extinguished with a foam extinguisher and powder is used only to complete the extinguishing or to protect ancillary equipment such as jigs and fixtures which might become involved, inert powder may be included in the composition to reduce the price.

Sodium bicarbonate may also be present in lesser amount than the potassium sulphate if maximum compatibility with foam is not essential.

Some examples of fire-extinguishing compositions according to the invention will now be given:

Example 1

Potassium sulphate, 96 parts by weight, i.e. about 90.1%
Talc, 5 parts by weight, i.e. about 4.7%
Mica, 4 parts by weight, i.e. about 3.8%
Paraffin wax of melting point 60° C., 1.5 parts by weight, i.e. about 1.4%

The first three ingredients were mixed together and a 10% solution of the wax in carbon tetrachloride was added. The solvent was allowed to evaporate and the mixture was ball-milled for 1½ hours.

Example 2

| | Percent by weight |
|---|---|
| Potassium sulphate | 99.25 |
| Water-repellant silicone | 0.75 |

The silicone was mixed with a part of the potassium sulphate, cured by heating at 78° C. for 1 hour and then mixed thoroughly with the remaining powder by ball-milling.

Example 3

Potassium sulphate, 90 parts by weight, i.e. about 88.1%
Heavy magnesium oxide, 10 parts by weight, i.e. about 9.77%
Magnesium stearate, 0.2 part by weight, i.e. about 0.19%
Talc, 1.97 parts by weight, i.e. about 1.92%
Beeswax (Yellow, English), 0.03 part by weight, i.e. about 0.02%

Example 4

Potassium sulphate, 96 parts by weight, i.e. about 92.3%
Heavy magnesium oxide, 4 parts by weight, i.e. about 3.8%
Mica, 4 parts by weight, i.e. about 3.8%
Magnesium stearate, 0.1 part by weight, i.e. about 0.1%

Example 5

Potassium sulphate, 50 parts by weight, i.e. about 46.9%
Sodium bicarbonate, 48 parts by weight, i.e. about 45.1%
Mica, 7 parts by weight, i.e. about 6.6%
Paraffin wax, melting point 60° C., 1.5 parts by weight, i.e. about 1.4%

The efficacy of powder according to the present invention and its compatibility with foam to extinguish burning gasoline are shown by a series of tests made on identical fires with two powders A and B. Powder A, according to the invention, had the composition given in Example 4. Powder B, used by way of comparison, had the following composition:

| | Parts |
|---|---|
| Sodium bicarbonate | 100 |
| Mica | 4 |
| Magnesium stearate | 1.5 |

In the first test two trays each containing two gallons of gasoline were used. The gasoline in each tray was allowed to burn for 30 seconds and then attacked with powder discharged from standard fire extinguishers, one containing 5 lbs. of powder A and the other 5 lbs. of powder B. Each fire was extinguished in under 3 seconds.

The second test was designed to simulate a fire in which gasoline is escaping and after being initially extinguished lights again. In each of two shallow trays 3 feet by 3 feet, 1,000 cc. of gasoline were placed and allowed to burn for 10 seconds. One fire was then extinguished with powder A and the other with powder B. Then a further 1,000 cc. of gasoline were added to each tray and ignited, and after burning for ten seconds the fire was attacked with foam. This was applied from a small extinguisher in two bursts of 5 seconds each. The fire in the tray attacked by powder B was not controlled but rather within a few seconds of the end of the application of the foam this fire was burning over the whole tray. In the other tray, attacked by powder A, 80% of the area of the tray was clear of flame after one minute from the end of the application of the foam, and over that area the blanket of foam showed little sign of breakdown.

In the third series of tests water was put in each of three trays and covered with ¾ gallon of gasoline, which was ignited and allowed to burn for 30 seconds. Foam was then applied to each of the trays, being caused to fall gently onto the burning gasoline, and extinguished each fire. The foam projecting above the upper edge of each tray was then removed, leaving a blanket of foam nearly 2 inches deep. One third of the area of the blanket was removed. 180 grams of powder A was uniformly distributed over the surface of the foam remaining in one tray by shaking through a sprinkling device and 180 grams of powder B was similarly applied to the foam on the second tray. No powder was applied to the third tray. The exposed gasoline in each tray was relit, and the times taken for the fire to destroy the whole of the remaining foam were recorded. The times were:

| | Minutes |
|---|---|
| Powder A | 6 |
| No powder | 6 |
| Powder B | 1½ |

These figures clearly show the complete compatibility of powder A with foam and the extent to which powder B containing sodium bicarbonate is incompatible with foam.

The compatibility of powder A with foam is further shown by another test in which a larger gasoline fire was attacked with 5 lbs. of powder A and simultaneously with foam. When all the powder had been applied the fire was still burning and the application of foam was continued. The foam controlled the fire and was not broken down by the presence of the powder.

Finally, in a laboratory test which is an excellent guide to the properties of fire-extinguishing agents, 5 grams of power A was sprinkled into a 150 cc. of gasoline in a small tray, which was allowed to burn for 20 seconds. Foam was applied for about 60 seconds and formed a stable blanket with only about 10% of the area of gasoline burning. Of course, if further foam had been applied the fire would have been extinguished. The test was repeated with 5 grams of powder B, and the foam broke down directly when it made contact with the burning gasoline and no blanket was formed.

We claim:

1. Fire extinguishing apparatus comprising a container charged with a dry free-flowing powder consisting essentially of potassium sulphate, and means for expelling the powder from the container and applying said power to the fire.

2. The method of fire fighting comprising applying a fire extinguishing powder to the fire, said powder consisting essentially of potassium sulphate.

3. The method of fire fighting comprising applying a fire extinguishing foam and a fire extinguishing powder to the fire, said powder consisting essentially of potassium sulphate.

(References on following page)

References Cited in the file of this patent
UNITED STATES PATENTS

| | | |
|---|---|---|
| 1,924,401 | Gilleo | Aug. 29, 1933 |
| 2,631,977 | Allen et al. | Mar. 17, 1953 |
| 2,816,864 | Warnock | Dec. 17, 1957 |
| 2,837,479 | Birchall | June 3, 1958 |
| 2,866,760 | Haessler et al. | Dec. 30, 1958 |
| 2,881,138 | Reiss | Apr. 7, 1959 |

FOREIGN PATENTS

| | | |
|---|---|---|
| 21,168 | Great Britain | 1909 |
| 674,476 | Great Britain | June 25, 1952 |
| 769,361 | Great Britain | Mar. 6, 1957 |